United States Patent
Li et al.

(10) Patent No.: US 9,252,691 B2
(45) Date of Patent: Feb. 2, 2016

(54) BACK ELECTROMAGNETIC FORCE (BEMF) SENSE SYSTEM

(71) Applicant: Texas Instruments Incorporated, Dallas, TX (US)

(72) Inventors: Qunying Li, Allen, TX (US); Joao Carlos Felicio Brito, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 234 days.

(21) Appl. No.: 13/965,628

(22) Filed: Aug. 13, 2013

(65) Prior Publication Data

US 2014/0097774 A1    Apr. 10, 2014

Related U.S. Application Data

(60) Provisional application No. 61/710,932, filed on Oct. 8, 2012.

(51) Int. Cl.
*H02P 6/06* (2006.01)
*H02P 6/18* (2006.01)

(52) U.S. Cl.
CPC ..................... *H02P 6/182* (2013.01)

(58) Field of Classification Search
CPC ....................................... H02P 6/182
USPC ............... 318/400.06, 400.34, 400.36
See application file for complete search history.

(56) References Cited

U.S. PATENT DOCUMENTS

| | | | |
|---|---|---|---|
| 5,672,948 A * | 9/1997 | Cohen et al. | 318/603 |
| 5,866,998 A * | 2/1999 | Menegoli | 318/400.27 |
| 6,879,124 B1 * | 4/2005 | Jiang et al. | 318/400.35 |
| 8,217,615 B2 * | 7/2012 | Tan et al. | 318/650 |

* cited by examiner

*Primary Examiner* — Erick Glass
(74) *Attorney, Agent, or Firm* — John R. Pessetto; Frank D. Cimino

(57) ABSTRACT

One embodiment includes a back-electromagnetic force (BEMF) sense system. The system includes a sense amplifier configured to measure an amplitude of a selected one of a plurality of phase voltages relative to a center tap voltage associated with a servo motor for the calculation of an associated BEMF voltage. The plurality of phase voltages can be provided to the sense amplifier via a respective plurality of control nodes. The selected one of the plurality of phase voltages on a respective one of the control nodes can be selected based on coupling the other of the plurality of control nodes associated with the other of the plurality of phase voltages to a voltage source configured to provide a predetermined voltage magnitude.

16 Claims, 3 Drawing Sheets

BACK ELECTROMAGNETIC FORCE (BEMF) SENSE SYSTEM

CROSS-REFERENCE TO RELATED APPLICATION

This application claims the benefit of U.S. Provisional Patent Application 61/710,932 filed on Oct. 8, 2012, entitled "HDD SERVO IC SPM AUTO-START BEMF SENSE AMPLIFIER", the entirety of which is incorporated by reference herein.

TECHNICAL FIELD

This disclosure relates generally to electronic circuit systems, and specifically to a back-electromagnetic force (BEMF) sense system.

BACKGROUND

Many computer systems include disk-drive memory systems to store data, such as hard-disk drives (HDD) and/or peripheral disk-drive systems. The disk-drives can incorporate a spindle motor that can be configured as a servo motor. To provide proper function of the disk-drive system, such as for auto-start procedures, it can be necessary to monitor a rotational speed of the disk-drive spindle motor, such as by measuring a back electromagnetic force (BEMF) of the servo motor for a given phase of the servo motor. The BEMF of the servo motor can be proportional to the rotational speed of the servo motor, such that a servo motor control scheme can be properly adjusted to maintain the rotational speed of the servo motor at a desired rate of rotation.

SUMMARY

One embodiment includes a back-electromagnetic force (BEMF) sense system. The system includes a sense amplifier configured to measure an amplitude of a selected one of a plurality of phase voltages relative to a center tap voltage associated with a servo motor for the calculation of an associated BEMF voltage. The plurality of phase voltages can be provided to the sense amplifier via a respective plurality of control nodes. The selected one of the plurality of phase voltages on a respective one of the control nodes can be selected based on coupling the other of the plurality of control nodes associated with the other of the plurality of phase voltages to a voltage source configured to provide a predetermined voltage magnitude.

Another embodiment includes a method for sensing a BEMF of a servo motor. The method includes providing a plurality of phase voltages associated with a respective plurality of phases of the servo motor to a sense amplifier. The method also includes selecting one of the plurality of phases to provide a phase-sense current through one of a respective plurality of phase transistors. The sense current can have a magnitude that is proportional to a respective one of the plurality of phase voltages. The method also includes providing a center tap current through a center tap transistor. The center tap current can have a magnitude that is proportional to a center tap voltage associated with the servo motor. The method further includes generating an output voltage based on a difference between a first voltage associated with the phase-sense current and a second voltage associated with the center tap current, and calculating the BEMF based on the output voltage.

Another embodiment includes a motor control system. The system includes a motor driver configured to provide a plurality of phase voltages to each of a respective plurality of phases of a servo motor to operate the servo motor. The system also includes a BEMF sense system that includes a sense amplifier. The sense amplifier includes a plurality of selection transistors that each interconnect a respective one of the plurality of control nodes and a voltage source. The plurality of selection transistors can be responsive to phase selection signals to select one of the plurality of phases for measurement of the BEMF of the servo motor based on decoupling one of the plurality of control nodes corresponding to the selected one of the plurality of phases from the voltage source and based on coupling a remaining at least one of the plurality of control nodes to the voltage source. The system also includes a processor configured to calculate the BEMF of the servo motor based on a difference between a respective selected one of the plurality of phase voltages and a center tap voltage associated with the servo motor.

DETAILED DESCRIPTION

This disclosure relates generally to electronic circuit systems, and specifically to a back-electromagnetic force (BEMF) sense system. A motor control system can include a motor driver and the BEMF sense system. The motor control system can be configured to generate a plurality of phase voltages that are each provided to a respective phase of a servo motor for operating the servo motor, such as in a disk-drive system. The BEMF sense system includes an input stage that is configured to receive the phase voltages and a center tap voltage associated with the servo motor and to generate adjusted magnitude phase voltages and an adjusted magnitude center tap voltage via voltage dividers. The input stage is coupled to a BEMF sense amplifier via a plurality of control nodes on which the adjusted magnitude phase voltages are provided and a center tap control node on which the adjusted magnitude center tap voltage is provided. The BEMF of the servo motor can be measured based on a difference between a given phase voltage and the center tap voltage, such that the rotational speed of the servo motor can be monitored.

A given phase of the servo motor can be selected for measurement of the phase voltage relative to the center tap voltage based on selection switches in the BEMF sense amplifier. The selection switches can be configured to decouple a control node corresponding to a selected one of the phases from a voltage source that provides a predetermined voltage, and can couple the control nodes corresponding to the non-selected phases to the voltage source. Each of the control nodes can be coupled to a control terminal of a phase transistor that is configured to conduct a sense current corresponding to the selected phase, with the sense current having a magnitude that is proportional to the respective phase voltage. As a result, the control nodes associated with the non-selected phases are held at the predetermined voltage to deactivate the respective phase transistors, while the phase transistor associated with the selected phase conducts the sense current. A voltage associated with the sense current can be compared with a voltage associated with a similarly-generated center tap sense current, such as via an operational amplifier (OP-AMP). Accordingly, a processor can calculate the BEMF associated with the servo motor based on the difference between the voltages associated with the sense currents.

Figure 1:
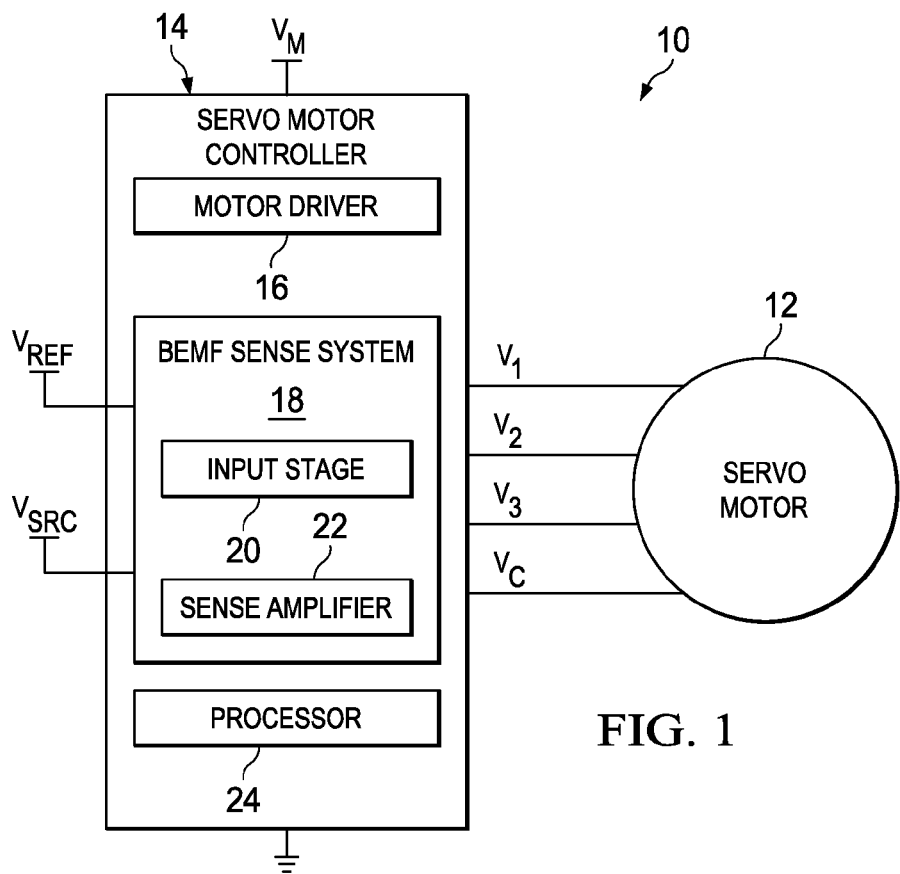
FIG. 1 illustrates an example of a servo motor system.

FIG. 1 illustrates an example of a servo motor system 10. The servo motor system 10 can be implemented in a variety of applications, such as a disk-drive system (e.g., a hard-disk drive (HDD) system). Thus, the servo motor system 10 can be implemented in a variety of computer systems for data storage applications, such that the servo motor system 10 can rotate a magnetic disk for reading data from and/or writing data to the magnetic disk.

The servo motor system 10 includes a servo motor 12 and a servo motor controller 14. In the example of FIG. 1, the servo motor 12 is configured as a three-phase servo motor that is controlled based on application of phase voltages $V_1$, $V_2$, and $V_3$ to the respective three phases in a given sequence of magnitudes based on a power voltage $V_M$. In the example of FIG. 1, the servo motor controller 14 includes a motor driver 16 that is configured to provide the phase voltages $V_1$, $V_2$, and $V_3$. As an example, the motor driver 16 can implement a pulse-width modulation (PWM) control scheme for applying the phase voltages $V_1$, $V_2$, and $V_3$ at a given duty-cycle in each iteration of a sequence. For example, for a given iteration, the motor driver 16 can be configured to provide one of the phase voltages $V_1$, $V_2$, and $V_3$ at a "high" magnitude (e.g., approximately 12 volts), another one of the phase voltages $V_1$, $V_2$, and $V_3$ at a "low" magnitude (e.g., approximately 0 volts), and will provide the remaining one of the phase voltages $V_1$, $V_2$, and $V_3$ at a "tri-state" or floating potential, such that it is neither forced to the high magnitude nor forced to the low magnitude. In response to the sequential application of the phase voltages $V_1$, $V_2$, and $V_3$, the servo motor 12 can rotate based on magnetic coupling of a stator with an associated rotor of the servo motor 12.

The motor driver 16 can be configured to control the servo motor 12 in a closed-loop manner, such that the motor driver 16 may provide the sequence of the phase voltages $V_1$, $V_2$, and $V_3$ (e.g., based on a duty-cycle of the PWM scheme) based on feedback. Thus, the servo motor controller 14 also includes a back-electromagnetic force (BEMF) sense system 18 that is configured to calculate a BEMF of the servo motor 12. The BEMF of the servo motor 12 can be expressed as a voltage $V_{BEMF}$ that is associated with a difference between a given one of the phase voltages $V_1$, $V_2$, and $V_3$ at the tri-state magnitude and a center tap voltage $V_C$ associated with a center tap of the servo motor 12 (e.g., provided as a "Y" motor). The voltage $V_{BEMF}$ can be directly proportional to a rotational speed of the servo motor 12, and can be expressed as follows:

$$V_{OUT1} = (V_X - V_C)_{VY\_H, VZ\_L} = V_{BEMF} + V_{MUT} \quad \text{Equation 1}$$

$$V_{OUT2} = (V_X - V_C)_{VY\_L, VZ\_L} = V_{BEMF} - V_{MUT} \quad \text{Equation 2}$$

Where:
$V_{OUT}$ is an output voltage associated with the BEMF sense system 18;
$V_X$ is a first of the phase voltages $V_1$, $V_2$, and $V_3$;
$V_Y$ is a second of the phase voltages $V_1$, $V_2$, and $V_3$, and which is held at a high magnitude in Equation 1 and is held at a low magnitude in Equation 2 for determination of the difference between the phase voltage $V_X$ and the center tap voltage $V_C$;
$V_Z$ is a third of the phase voltages $V_1$, $V_2$, and $V_3$, and which is held at a low magnitude in Equations 1 and 2 for determination of the difference between the phase voltage $V_X$ and the center tap voltage $V_C$; and $V_{MUT}$ is a mutual inductance voltage of the three phases of the servo motor 12.

Therefore, based on Equations 1 and 2, the mutual inductance voltage $V_{MUT}$ can be calculated as follows:

$$V_{MUT} = (\frac{1}{2}) * (V_{OUT1} - V_{OUT2}) \quad \text{Equation 3}$$

Accordingly, based on calculating the mutual inductance voltage $V_{MUT}$, the BEMF voltage $V_{BEMF}$ can be calculated by substituting the mutual inductance voltage $V_{MUT}$ into either of Equations 1 or 2.

Figure 2:
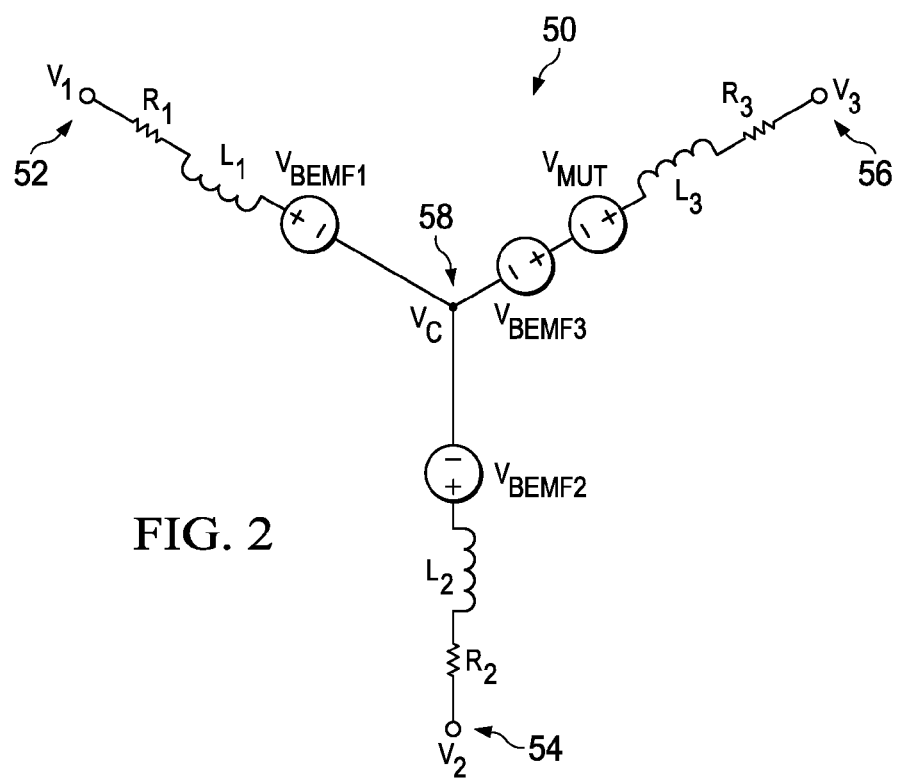
FIG. 2 illustrates an example of a motor circuit.

FIG. 2 illustrates an example of a motor circuit 50. The motor circuit 50 can correspond to the servo motor 12 in the example of FIG. 1. Therefore, reference is to be made to the example of FIG. 1 in the following description of the example of FIG. 2.

In the example of FIG. 2, the motor circuit 50 is demonstrated as a "Y" motor having a first phase 52, a second phase 54, and a third phase 56 to which the phase voltages $V_1$, $V_2$, and $V_3$ are applied to respective taps by the motor controller 16, respectively. In each of the phases 52, 54, and 56, the motor circuit 50 includes a series connection of a resistor and an inductor between an associated tap and a center tap 58. The series connection of resistor and inductor is demonstrated as a resistor $R_1$ and an inductor $L_1$ for the first phase 52, a resistor $R_2$ and an inductor $L_2$ for the second phase 54, and a resistor $R_3$ and an inductor $L_3$ for the third phase 56. The inductors $L_1$, $L_2$, and $L_3$ can correspond to stator coils for the servo motor 12 for generating a magnetic field for rotating an associated rotor.

In each of the phases 52, 54, and 56, a BEMF voltage $V_{BEMF}$ is provided, demonstrated as a voltage $V_{BEMF1}$ in the first phase 52, a voltage $V_{BEMF2}$ in the second phase 54, and a voltage $V_{BEMF3}$ in the third phase 56. The magnitude of the BEMF voltage $V_{BEMF}$ can be measured for a given one of the phases 52, 54, and 56 for which the respective phase voltage $V_1$, $V_2$, and $V_3$ is in the tri-state magnitude. The measured BEMF voltage $V_{BEMF}$ can be utilized to determine a speed of rotation of the servo motor 12 for accurate feedback control of the servo motor 12. In the example of FIG. 2, the phase voltage $V_3$ in the third phase 56 is to measured relative to the center tap voltage $V_C$ for calculation of the BEMF voltage $V_{BEMF3}$. Therefore, the phase voltage $V_1$ and the phase voltage $V_2$ can be held at the high and low magnitudes, respectively, and the mutual inductance voltage $V_{MUT}$ is also provided in the third phase 56.

Referring back to the example of FIG. 1, the BEMF sense system 18 includes an input stage 20 and a sense amplifier 22. The input stage 20 is configured to receive the center tap voltage $V_C$ and the phase voltages $V_1$, $V_2$, and $V_3$ from the servo motor 12 and to provide the center tap voltage $V_C$ and the phase voltages $V_1$, $V_2$, and $V_3$ on respective control nodes as having an adjusted magnitude. For example, the input stage 20 can include a plurality of voltage dividers that each provide a respective one of the center tap voltage $V_C$ and the phase voltages $V_1$, $V_2$, and $V_3$ at the adjusted magnitude relative to a reference voltage $V_{REF}$. The sense amplifier 22 can be coupled to the input stage 20 via the control nodes. As an example, the sense amplifier 22 can include a set of selection transistors that are responsive to phase selection signals to couple and decouple the control nodes to a voltage source having a predetermined voltage magnitude to provide a respective selected one of the phase voltages $V_1$, $V_2$, and $V_3$ to be measured by the sense amplifier 22 relative to the center tap voltage $V_C$ for the calculation of the BEMF voltage $V_{BEMF}$. In the example of FIG. 1, the servo motor controller 14 also includes a processor 24 that can be configured to calculate the BEMF voltage $V_{BEMF}$ based on the measured one of the phase voltages $V_1$, $V_2$, or $V_3$ relative to the center tap voltage $V_C$, such as based on implementing Equations 1-3 described previously. The voltage source to and from which the control nodes can be coupled via the selection transistors can be an external voltage source that is configured to provide a voltage $V_{SRC}$ to the BEMF sense system 18 that can be provided via an external power supply. As described herein, the voltage source can be a power supply configured to provide a positive or negative power voltage, or can be ground, such that the voltage source provides the predetermined voltage magnitude of zero volts.

The coupling and decoupling of the control nodes in the sense amplifier 22 can provide for selection of the respective one of the phase voltages for measuring based on deactivating phase transistors corresponding to non-selected phases and providing a current through a phase transistor corresponding to the selected phase, with the current being proportional to the selected one of the phase voltages $V_1$, $V_2$, and $V_3$, respectively, with respect to the center tap voltage $V_C$. To enhance circuit measurement accuracy, the sense amplifier 22 does not implement selection switches in the signal path of the phase voltages $V_1$, $V_2$, and $V_3$ provided to the sense amplifier 22. As a result, the sense amplifier 22 can measure the magnitude of the selected one of the phase voltages $V_1$, $V_2$, and $V_3$ more accurately relative to typical BEMF sense systems that implement selection switches in the signal path of the phase voltages provided to the sense amplifier and which use a multiplexer to time the selective switching of the selected one of the phase voltages to the sense amplifier. In other words, the sense amplifier 22 provides selection of the one of the phase voltages $V_1$, $V_2$, and $V_3$ provided to the sense amplifier 22 without introducing additional resistance that can change the magnitude of the selected one of the phase voltages $V_1$, $V_2$, and $V_3$, particularly based on issues (e.g., voltage coefficient and temperature coefficient issues) that can vary the on-resistance $R_{DS\_ON}$ of the switches in the signal path of the phase voltages $V_1$, $V_2$, and $V_3$.

Figure 3:
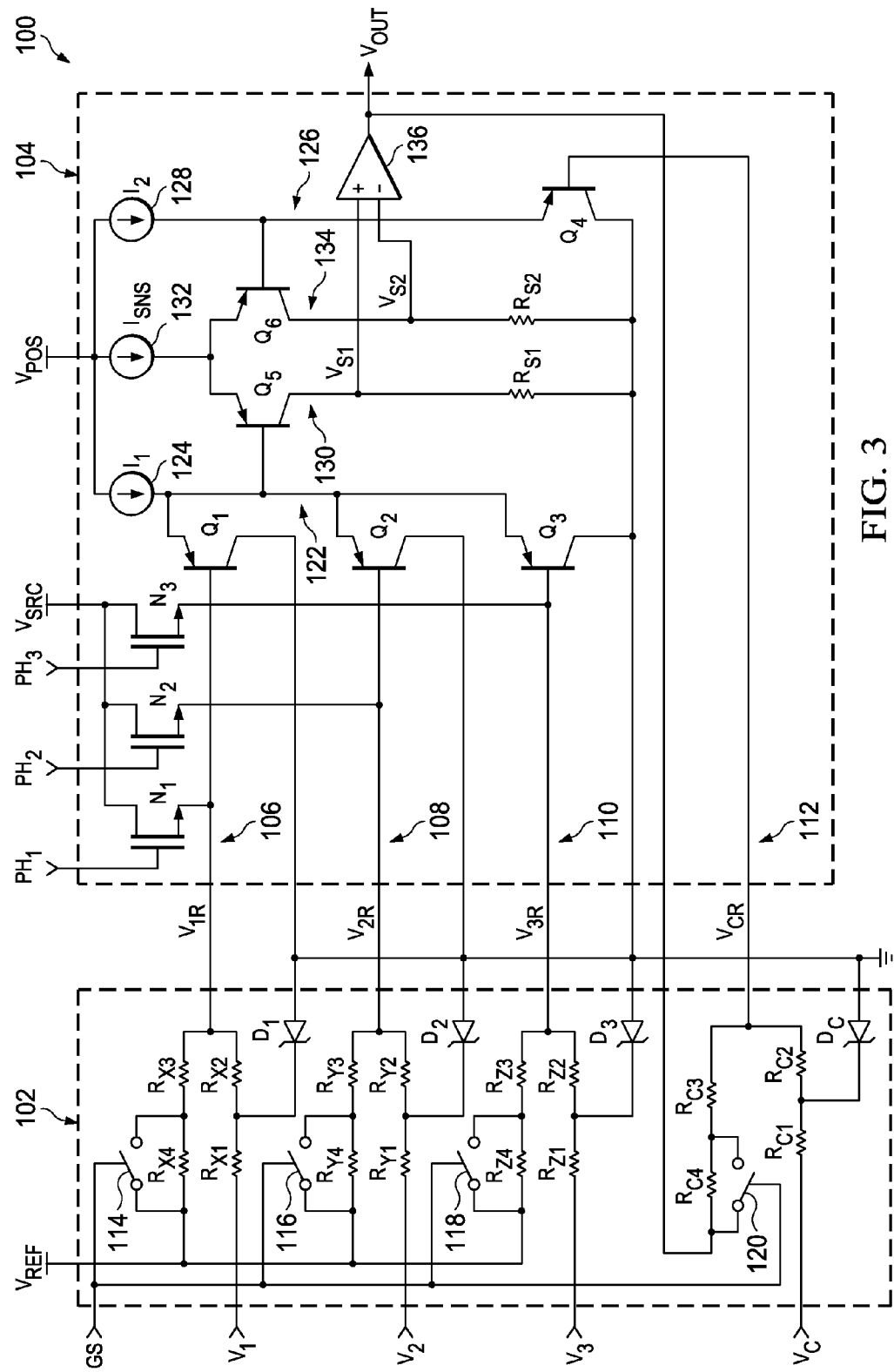
FIG. 3 illustrates an example of a BEMF sense system.

FIG. 3 illustrates an example of a BEMF sense system 100. The BEMF sense system 100 can correspond to the BEMF sense system 18 in the example of FIG. 1. Therefore, reference is to be made to the example of FIGS. 1 and 2 in the following description of the example of FIG. 3.

The BEMF sense system 100 includes an input stage 102 and a sense amplifier 104. The input stage 102 is configured to receive the phase voltages $V_1$, $V_2$, and $V_3$ and to provide adjusted phase voltages $V_{1R}$, $V_{2R}$, and $V_{3R}$ on each of respective control lines 106, 108, and 110 via voltage dividers with respect to the reference voltage $V_{REF}$. In the example of FIG. 3, the phase voltage $V_1$ is provided to the control line 106 via resistors $R_{X1}$ and $R_{X2}$ and the reference voltage $V_{REF}$ is provided to the control line 106 via resistors $R_{X3}$ and $R_{X4}$ to generate the adjusted phase voltage $V_{1R}$. Similarly, the phase voltage $V_2$ is provided to the control line 108 via resistors $R_{Y1}$ and $R_{Y2}$ and the reference voltage $V_{REF}$ is provided to the control line 108 via resistors $R_{Y3}$ and $R_{Y4}$ to generate the adjusted phase voltage $V_{2R}$. Additionally, the phase voltage $V_3$ is provided to the control line 110 via resistors $R_{Z1}$ and $R_{Z2}$ and is the reference voltage $V_{REF}$ is provided to the control line 110 via resistors $R_{Z3}$ and $R_{Z4}$ to generate the adjusted phase voltage $V_{3R}$. The center tap voltage $V_C$ is provided to a center tap control line 112 via resistors $R_{C1}$ and $R_{C2}$, and an output voltage $V_{OUT}$ that is output from the sense amplifier 104 is provided to the center tap control line 112 via resistors $R_{C3}$ and $R_{C4}$ to generate an adjusted center tap voltage $V_{CR}$. As an example, all of the resistors in a given one of the voltage-dividers can be nominally equal.

The input stage 102 also includes zener diodes that interconnect each of the voltage dividers with a low voltage rail, demonstrated in the example of FIG. 3 as ground. In the example of FIG. 3, a zener diode $D_1$ has an anode coupled to ground and is coupled to the resistors $R_{X1}$ and $R_{X2}$ at a cathode, a zener diode $D_2$ has an anode coupled to ground and is coupled to the resistors $R_{Y1}$ and $R_{Y2}$ at a cathode, a zener diode $D_3$ has an anode coupled to ground and is coupled to the resistors $R_{Z1}$ and $R_{Z2}$ at a cathode, and a zener diode $D_C$ has an anode coupled to ground and is coupled to the resistors $R_{C1}$ and $R_{C2}$ at a cathode. The zener diodes $D_1$, $D_2$, $D_3$, and $D_C$ are configured to relieve front attenuation and to maintain a sufficient dynamic range for the phase voltages $V_1$, $V_2$, and $V_3$ and the center tap voltage $V_C$. The zener diodes can also clamp the high magnitude of the phase voltages $V_1$, $V_2$, and $V_3$ that are above device safety tolerance levels. While the example of FIG. 3 demonstrates that the zener diodes $D_1$, $D_2$, $D_3$, and $D_C$ are provided between the resistors of the voltage-dividers, it is to be understood that the zener diodes could be coupled to the voltage dividers in a different manner to affect the dynamic range and clamping functions. For example, the zener diodes could be coupled at the cathode to the control lines 106, 108, 110, and 112 to substantially improve dynamic range while sacrificing clamping potential of the phase voltages $V_1$, $V_2$, and $V_3$. As another example, the cathode of each of the zener diodes could be coupled to the respective phase voltages $V_1$, $V_2$, and $V_3$ to substantially improve clamping capabilities of the phase voltages $V_1$, $V_2$, and $V_3$ while possibly sacrificing dynamic range.

In addition, the input stage 102 includes a set of switches that are each configured to bypass a given resistor of the voltage dividers in response to a gain control signal GS. A first switch 114 is coupled across the resistor $R_{X4}$, a second switch 116 is coupled across the resistor $R_{Y4}$, a third switch 118 is coupled across the resistor $R_{Z4}$, and a fourth switch 120 is coupled across the resistor $R_{C4}$. The switches 114, 116, 118, and 120 are therefore configured to bypass the respective resistors $R_{X4}$, $R_{Y4}$, $R_{Z4}$, and $R_{C4}$ in response to the gain control signal GS to further adjust the magnitudes of the respective adjusted phase voltages $V_{1R}$, $V_{2R}$, and $V_{3R}$, as well as the adjusted center tap voltage $V_{CR}$, and thus to modify the gain of the BEMF sense system 100.

In the example of FIG. 3, the control line 106 is coupled to a control terminal of phase transistor $Q_1$, the control line 108 is coupled to a control terminal of phase transistor $Q_2$, the control line 110 is coupled to a control terminal of phase transistor $Q_3$. The phase transistors $Q_1$, $Q_2$, and $Q_3$ are demonstrated as PNP-type bipolar junction transistors (BJTs) having emitters coupled to a first current node 122 and having collectors coupled to the low voltage rail. A current source 124 that provides a current $I_1$ interconnects a power voltage $V_{POS}$ and the current node 122. Therefore, in response to activation of a given one of the phase transistors $Q_1$, $Q_2$, and $Q_3$, the current $I_1$ flows through the given activated one of the phase transistors $Q_1$, $Q_2$, and $Q_3$. In addition, the center tap control line 112 is coupled to a control terminal of a center tap transistor $Q_4$. The center tap transistor $Q_4$ has a collector coupled to a second current node 126 and has an emitter coupled to the low voltage rail. A current source 128 that provides a current $I_2$ interconnects the power voltage $V_{POS}$ and the current node 126. As an example, the current sources 124 and 128 can be nominally equal.

The sense amplifier 104 includes a plurality of selection transistors $N_1$, $N_2$, and $N_3$ that are activated in response to phase selection signals $PH_1$, $PH_2$, and $PH_3$, respectively. In the example of FIG. 3, the selection transistors $N_1$, $N_2$, and $N_3$ are demonstrated as N-type metal-oxide semiconductor fieldeffect transistors (MOSFETs). The selection transistor $N_1$ interconnects the voltage $V_{SRC}$ and the control line 106, the selection transistor $N_2$ interconnects the voltage $V_{SRC}$ and the control line 108, and the selection transistor $N_3$ interconnects the voltage $V_{SRC}$ and the control line 110. The given one of the phase transistors $Q_1$, $Q_2$, and $Q_3$ corresponding to the selected phase for measurement of the BEMF voltage $V_{BEMF}$ is activated based on the activation of the selection transistors $N_1$, $N_2$, and $N_3$ to couple and de-couple the respective control lines 106, 108, and 110 to and from the voltage $V_{SRC}$.

For example, for selection of the phase 52 for measuring the phase voltage $V_1$ relative to the center tap voltage $V_C$, the selection transistor $N_1$ is deactivated to de-couple the control line 106 from the voltage $V_{SRC}$ and the selection transistors $N_2$ and $N_3$ are each activated to couple the respective control lines 108 and 110 to the voltage $V_{SRC}$. Therefore, because the control lines 108 and 110 are held at the high predetermined voltage magnitude $V_{SRC}$, the phase transistors $Q_2$ and $Q_3$ are deactivated, and the phase transistor $Q_1$ is activated to conduct the current $I_1$ at a magnitude that is proportional to the adjusted voltage $V_{1R}$. To select the phase 54 for measuring the phase voltage $V_2$ relative to the center tap voltage $V_C$, the selection transistor $N_2$ is deactivated to de-couple the control line 108 from the voltage $V_{SRC}$ and the selection transistors $N_1$ and $N_3$ are each activated to couple the respective control lines 106 and 110 to the voltage $V_{SRC}$. Therefore, because the control lines 106 and 110 are held at the high predetermined voltage magnitude $V_{SRC}$, the phase transistors $Q_1$ and $Q_3$ are deactivated, and the phase transistor $Q_2$ is activated to conduct the current $I_1$ at a magnitude that is proportional to the adjusted voltage $V_{2R}$. For selection of the phase 56 for measuring the phase voltage $V_3$ relative to the center tap voltage $V_C$, the selection transistor $N_3$ is deactivated to de-couple the control line 110 from the voltage $V_{SRC}$ and the selection transistors $N_1$ and $N_2$ are each activated to couple the respective control lines 106 and 108 to the voltage $V_{SRC}$. Therefore, because the control lines 106 and 108 are held at the high predetermined voltage magnitude $V_{SRC}$, the phase transistors $Q_1$ and $Q_2$ are deactivated, and the phase transistor $Q_3$ is activated to conduct the current $I_1$ at a magnitude that is proportional to the adjusted voltage $V_{3R}$. Furthermore, the center tap transistor $Q_4$ is activated to conduct the current $I_2$ at a magnitude that is proportional to the adjusted center tap voltage $V_{CR}$.

The sense amplifier 104 also includes a first sense transistor $Q_5$ and a second sense transistor $Q_6$. The first sense transistor $Q_5$ has a base that is coupled to the first current node 122 and interconnects a current source 132 that is configured to generate a current $I_{SNS}$ and a first sense node 130. The second sense transistor $Q_6$ has a base that is coupled to the second current node 126 and interconnects the current source 132 and a second sense node 134. Based on the connection of the base of the first and second sense transistors $Q_5$ and $Q_6$ to the first and second current nodes 122 and 126, respectively, the first and second sense transistors $Q_5$ and $Q_6$ can each be activated to conduct respective portions of the current $I_{SNS}$ that are proportional to the selected one of the adjusted phase voltages $V_1$, $V_2$, and $V_3$ and the adjusted center tap voltage $V_{CR}$. The respective portions of the current $I_{SNS}$ are provided through a first sense resistor $R_{S1}$ that interconnects the first sense node 130 and the low voltage rail to generate a first sense voltage $V_{S1}$ and a second sense resistor $R_{S2}$ that interconnects the second sense node 134 and the low voltage rail to generate a second sense voltage $V_{S2}$. The sense amplifier 104 further includes an operational amplifier (OP-AMP) 136, for example, having a non-inverting input coupled to the first sense node 130 and an inverting input coupled to the second sense node 134. Therefore, the OP-AMP 136 is configured to compare the first and second sense voltages $V_{S1}$ and $V_{S2}$ to generate the output voltage $V_{OUT}$ that is associated with a difference between the selected one of the phase voltages $V_1$, $V_2$, and $V_3$ and the center tap voltage $V_C$. Thus, the output voltage $V_{OUT}$ can be implemented in Equations 1-3 by the processor 24 to calculate the BEMF voltage $V_{BEMF}$ for measuring the BEMF of the servo motor 12, and thus the rotational speed of the servo motor 12. Accordingly, the motor driver 16 can adjust the PWM control scheme of the application of the phase voltages $V_1$, $V_2$, and $V_3$ for controlling the servo motor 12.

The coupling and decoupling of the control nodes 106, 108, and 110 in the sense amplifier 104 can provide for selection of the respective one of the phase voltages $V_1$, $V_2$, and $V_3$ for measurement based on activating and deactivating the phase transistors $Q_1$, $Q_2$, and $Q_3$, respectively, and therefore provides for selection of the respective one of the phase voltages $V_1$, $V_2$, and $V_3$ for measurement without introducing switching resistance in the signal path of the phase voltages $V_1$, $V_2$, and $V_3$ provided to the sense amplifier 104. As a result, the sense amplifier 104 can generate the output voltage $V_{OUT}$ as a measure of the magnitude of the selected one of the phase voltages $V_1$, $V_2$, and $V_3$ relative to the center tap voltage $V_C$ more accurately relative to typical BEMF sense systems that implement selection switches in the signal path of the phase voltages provided to the sense amplifier. Accordingly, the sense amplifier 104 provides selection of the one of the phase voltages $V_1$, $V_2$, and $V_3$ provided to the sense amplifier 104 without introducing additional on-state resistance $R_{DS\_ON}$ of in-path switches that can unpredictably change the magnitude of the adjusted phase voltages $V_{1R}$, $V_{2R}$, and $V_{3R}$, which can provide errors in the measure of the BEMF of the servo motor, and thus the rotation speed of the servo motor.

Figure 4:
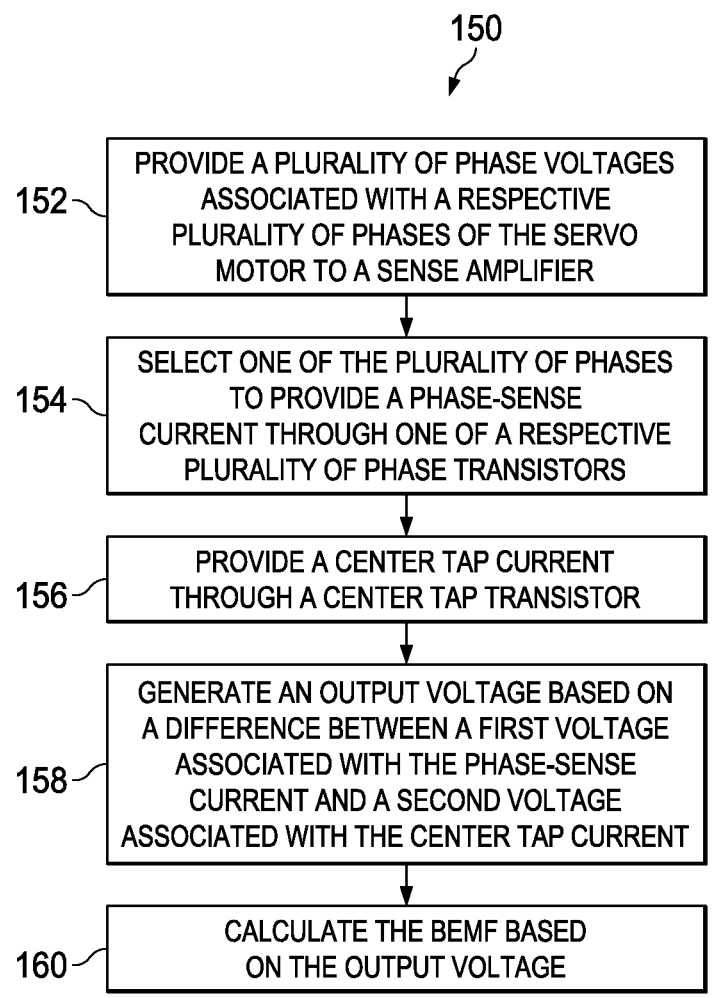
FIG. 4 illustrates an example of a method for sensing a BEMF of a servo motor.

In view of the foregoing structural and functional features described above, certain methods will be better appreciated with reference to FIG. 4. It is to be understood and appreciated that the illustrated actions, in other embodiments, may occur in different orders and/or concurrently with other actions. The methods can be performed by circuitry, including analog, digital or a combination of analog and digital circuitry. Moreover, not all illustrated features may be required to implement a method.

FIG. 4 illustrates an example of a method 150 for sensing BEMF of a servo motor (e.g., the servo motor 12). At 152, a plurality of phase voltages (e.g., the phase voltages $V_1$, $V_2$, and $V_3$) associated with a respective plurality of phases (e.g., the phases 52, 54, and 56) of the servo motor are provided to a sense amplifier (e.g., the sense amplifier 22). At 154, one of the plurality of phases is selected to provide a phase-sense current (e.g., the current $I_1$) through one of a respective plurality of phase transistors (e.g., the phase transistors $Q_1$, $Q_2$, and $Q_3$). The sense current can have a magnitude that is proportional to a respective one of the plurality of phase voltages. At 156, a center tap current (e.g., the current $I_2$) is provided through a center tap transistor (e.g., the center tap transistor $Q_4$). The center tap current can have a magnitude that is proportional to a center tap voltage (e.g., the center tap voltage $V_C$) associated with the servo motor. At 158, an output voltage (e.g., the output voltage $V_{OUT}$) is generated based on a difference between a first voltage (e.g., the first sense voltage $V_{S1}$) associated with the phase-sense current and a second voltage (e.g., the second sense voltage $V_{S2}$) associated with the center tap current. At 160, the BEMF (e.g., the BEMF voltage $V_{BEMF}$) is calculated based on the output voltage.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A back-electromagnetic force (BEMF) sense system comprising a sense amplifier configured to measure an amplitude of a selected one of a plurality of phase voltages relative to a center tap voltage associated with a servo motor for the calculation of an associated BEMF voltage, the plurality of phase voltages being provided to the sense amplifier via a respective plurality of control nodes, the selected one of the plurality of phase voltages on a respective one of the control nodes being selected based on coupling the other of the plurality of control nodes associated with the other of the plurality of phase voltages to a voltage source configured to provide a predetermined voltage magnitude, wherein the BEMF sense system further comprises an input stage comprising a plurality of voltage dividers that are each associated with one of the plurality of phase voltages or the center tap voltage to provide the plurality of phase voltages on the respective plurality of control nodes to the sense amplifier at an adjusted magnitude relative to a reference voltage, and to provide the center tap voltage on a center tap control node to the sense amplifier at an adjusted magnitude relative to an output voltage of the sense amplifier corresponding to the amplitude of the selected one of a plurality of phase voltages relative to the center tap voltage, and wherein each of the plurality of voltage dividers comprises a switch configured to bypass at least one resistor associated with a respective one of the plurality of voltage dividers to implement gain control associated with the plurality of voltage dividers in response to a gain control signal.

2. The system of claim 1, wherein the sense amplifier comprises a plurality of selection transistors that each interconnects a respective one of the plurality of control nodes and the voltage source, the plurality of selection transistors being configured to couple the other of the plurality of control nodes associated with the other of the plurality of phase voltages to the voltage source in response to respective selection signals.

3. The system of claim 1, wherein the BEMF sense system is configured to sequentially select each of the plurality of phase voltages to measure the amplitude of the selected one of a plurality of phase voltages relative to the center tap voltage associated with the servo motor for the calculation of the associated BEMF voltage.

4. The system of claim 1, wherein each of the plurality of voltage dividers comprises a diode having an anode coupled to a voltage source and having a cathode coupled to at least one resistor associated with a respective one of the plurality of voltage dividers.

5. The system of claim 1, wherein the center tap voltage is provided to the sense amplifier via a center tap control node, wherein each of the plurality of control nodes is coupled to a control terminal of a respective one of a plurality of phase transistors, wherein the center tap control node is coupled to a control terminal of a respective center tap transistor, the center tap transistor and one of the plurality of phase transistors associated with the one of the plurality of phase voltages conducting currents having magnitudes that are proportional to a magnitude of the center tap voltage and the respective one of the plurality of phase voltages, respectively.

6. The system of claim 5, wherein the plurality of phase transistors are coupled to a control terminal of a first sense transistor and the center tap transistor is coupled to a control terminal of a second sense transistor, wherein the first sense transistor is configured to conduct a first sense current and the second sense transistor is configured to conduct a second sense current associated with the currents having magnitudes that are proportional to a magnitude of the center tap voltage and the respective one of the plurality of phase voltages, respectively.

7. The system of claim 6, wherein the sense amplifier further comprises an operational amplifier (OP-AMP) configured to compare a first sense voltage associated with the first sense current and a second sense voltage associated with the second sense current to generate an output voltage corresponding to a difference between the one of the plurality of voltages and the center tap voltage.

8. A motor control system comprising the BEMF sense system of claim 1, the motor control system further comprising a motor driver configured to provide the plurality of phase voltages to each of a respective plurality of phases of the servo motor to operate the servo motor.

9. An integrated circuit comprising the BEMF sense system of claim 1.

10. A method for sensing a back-electromagnetic force (BEMF) of a servo motor, the method comprising:
providing a plurality of phase voltages associated with a respective plurality of phases of the servo motor to a sense amplifier;
selecting one of the plurality of phases to provide a phase-sense current through one of a respective plurality of phase transistors, the sense current having a magnitude that is proportional to a respective one of the plurality of phase voltages;
providing a center tap current through a center tap transistor, the center tap current having a magnitude that is proportional to a center tap voltage associated with the servo motor;
generating an output voltage based on a difference between a first voltage associated with the phase-sense current and a second voltage associated with the center tap current; and
calculating the BEMF based on the output voltage,
wherein selecting the one of the plurality of phases comprises:
decoupling a control node on which the respective one of the plurality of phase voltages is provided from a power supply configured to provide a voltage magnitude via a phase selection switch; and
coupling at least one additional control node on which a remaining at least one of the plurality of phase voltages is provided to the power supply via at least one additional phase selection switch.

11. The method of claim 10, wherein providing the plurality of phase voltages comprises providing the plurality of phase voltages to the sense amplifier via an input stage, the input stage comprising a plurality of voltage dividers that are each associated with one of the plurality of phase voltages or the center tap voltage to provide the plurality of phase voltages on the respective plurality of control nodes to the sense amplifier at an adjusted magnitude relative to a reference voltage, and to provide the center tap voltage on a center tap control node to the sense amplifier at an adjusted magnitude relative to the output voltage.

12. The method of claim 11, further comprising activating a plurality of switches associated with the respective plurality of voltage dividers to bypass at least one resistor associated with each of the plurality of voltage dividers to implement gain control associated with the plurality of voltage dividers in response to a gain control signal.

13. The method of claim 11, wherein each of the plurality of voltage dividers comprises a diode having an anode coupled to a voltage source and having a cathode coupled to at least one resistor associated with a respective one of the plurality of voltage dividers.

14. A motor control system comprising:
 a motor driver configured to provide a plurality of phase voltages to each of a respective plurality of phases of a servo motor to operate the servo motor;
 a back-electromagnetic force (BEMF) sense system comprising a sense amplifier, the sense amplifier comprising a plurality of selection transistors that each interconnect a respective one of the plurality of control nodes and a voltage source, the plurality of selection transistors being responsive to phase selection signals to select one of the plurality of phases for measurement of the BEMF of the servo motor based on decoupling one of the plurality of control nodes corresponding to the selected one of the plurality of phases from the voltage source and based on coupling a remaining at least one of the plurality of control nodes to the voltage source; and
 a processor configured to calculate the BEMF of the servo motor based on a difference between a respective selected one of the plurality of phase voltages and a center tap voltage associated with the servo motor,
 wherein the BEMF sense system further comprises an input stage comprising a plurality of voltage dividers that are each associated with one of the plurality of phase voltages or the center tap voltage to provide the plurality of phase voltages on the respective plurality of control nodes to the sense amplifier at an adjusted magnitude relative to a reference voltage, and to provide the center tap voltage on a center tap control node to the sense amplifier at an adjusted magnitude relative to an output voltage of the sense amplifier corresponding to the amplitude of the selected one of a plurality of phase voltages relative to the center tap voltage.

15. The system of claim 14, wherein each of the plurality of voltage dividers comprises a diode having an anode coupled to a voltage source and having a cathode coupled to at least one resistor associated with a respective one of the plurality of voltage dividers.

16. The system of claim 14, wherein the center tap voltage is provided to the sense amplifier via a center tap control node,
 wherein each of the plurality of control nodes is coupled to a control terminal of a respective one of a plurality of phase transistors,
 wherein the center tap control node is coupled to a control terminal of a respective center tap transistor, the center tap transistor and one of the plurality of phase transistors associated with the respective one of the plurality of phase voltages conducting currents having magnitudes that are proportional to a magnitude of the center tap voltage and the respective one of the plurality of phase voltages, respectively, and
 wherein the sense amplifier further comprises an operational amplifier (OP-AMP) configured to compare a first sense voltage and a second sense voltage associated with currents having magnitudes that are proportional to a magnitude of the center tap voltage and the respective one of the plurality of phase voltages, respectively to generate an output voltage corresponding to the difference between the respective one of the plurality of voltages and the center tap voltage.

\* \* \* \* \*